(12) United States Patent
Ojala

(10) Patent No.: US 9,467,790 B2
(45) Date of Patent: Oct. 11, 2016

(54) REVERBERATION ESTIMATOR

(75) Inventor: Pasi Ojala, Kirkkonummi (FI)

(73) Assignee: Nokia Technologies Oy, Espoo (FI)

( * ) Notice: Subject to any disclaimer, the term of this patent is extended or adjusted under 35 U.S.C. 154(b) by 539 days.

(21) Appl. No.: 13/810,877

(22) PCT Filed: Jul. 20, 2010

(86) PCT No.: PCT/IB2010/053310
§ 371 (c)(1),
(2), (4) Date: Apr. 29, 2013

(87) PCT Pub. No.: WO2012/010929
PCT Pub. Date: Jan. 26, 2012

(65) Prior Publication Data
US 2013/0208903 A1    Aug. 15, 2013

(51) Int. Cl.
| | |
|---|---|
| G10L 25/00 | (2013.01) |
| H04R 29/00 | (2006.01) |
| G10H 7/00 | (2006.01) |
| G10L 25/48 | (2013.01) |
| G10L 19/083 | (2013.01) |
| G10L 21/0216 | (2013.01) |
| G10L 21/0208 | (2013.01) |
| G10L 19/08 | (2013.01) |

(52) U.S. Cl.
CPC ............ *H04R 29/00* (2013.01); *G10H 7/00* (2013.01); *G10L 25/48* (2013.01); *G10L 19/08* (2013.01); *G10L 19/083* (2013.01); *G10L 21/0216* (2013.01); *G10L 2021/02087* (2013.01)

(58) Field of Classification Search
CPC .... G10L 19/008; G10L 19/083; G10L 19/09
See application file for complete search history.

(56) References Cited

U.S. PATENT DOCUMENTS

| | | |
|---|---|---|
| 2004/0213415 A1 | 10/2004 | Rama et al. |
| 2005/0141721 A1 | 6/2005 | Aarts et al. |
| 2006/0233381 A1 | 10/2006 | Seo et al. |
| 2008/0069016 A1 | 3/2008 | Cao et al. |
| 2008/0281602 A1* | 11/2008 | Van Schijndel et al. ..... 704/500 |
| 2009/0122640 A1 | 5/2009 | Hill et al. |
| 2009/0182563 A1 | 7/2009 | Schobben et al. |

FOREIGN PATENT DOCUMENTS

| | | |
|---|---|---|
| WO | WO-2005/122640 A1 | 12/2005 |
| WO | WO-2009/029076 A1 | 3/2009 |

OTHER PUBLICATIONS

Stewart R, Sandler M. Statistical measures of early reflections of room impulse responses. In: Proc. of the 10th int. conference on digital audio effects (DAFx-07), Bordeaux, France; 2007. p. 59-62.*
Supplemental European Search Report for Application No. EP 10 85 4981 dated Nov. 14, 2013.
International Search Report for Application No. PCT/IB2010/053310 dated Apr. 1, 2011.

(Continued)

*Primary Examiner* — Duc Nguyen
*Assistant Examiner* — Kile Blair
(74) *Attorney, Agent, or Firm* — Alston & Bird LLP

(57) ABSTRACT

A method comprising determining a reverberation time estimate for an audio signal from a first part of an encoded audio signal representing the audio signal.

21 Claims, 8 Drawing Sheets

(56) References Cited

OTHER PUBLICATIONS

Schroeder, M.R., *New Method of Measuring Reverberation Time*, Journal of The Acoustical Society of America, vol. 37 (1965) pp. 409-412.

International Preliminary Report on Patentability/Written Opinion for Application No. PCT/IB2010/053310 dated Jan. 22, 2013.
Office Action for European Application No. 10 854 981.7 dated Jun. 17, 2015.
Office Action for European Application No. 10 854 981.7 dated Nov. 2, 2015.

* cited by examiner

REVERBERATION ESTIMATOR

FIELD OF THE INVENTION

The present invention relates to an apparatus and method for reverberation estimation, and in particular, but not exclusively to an apparatus and method suitable for reverberation estimation in portable equipment.

BACKGROUND OF THE INVENTION

Audio scene analysis is important in augmented reality applications. In augmented reality applications additional layers such as additional audio layers or visual layers can be overlaid upon the user's own senses to provide a richer and more information laden environment for the user to explore. One part of audio scene analysis is spatial audio scene estimation and context extraction whereby the environment surrounding the user and the device is analysed in order that the additional layer when overlaid does not distract the user but instead provides a synergistic effect when perceived by the user.

Augmented reality audio layers in order not to be distracting are required to be aligned to the current context of the user. That is when adding an artificial audio source within the audio scenery, the content must not sound unnatural and should therefore be aimed at providing a user experience which is as natural as possible. This for example is not the case if a source reverberation of the augmented reality audio layer is different to that of the audio scenery of the environment surrounding the user and device. For example where the user is operating in a highly reverberant subway station, the augmented content requires also to have "reverberation" to not to sound unnatural. Therefore in order to accomplish this goal the augmentation engine requires an accurate estimate of the given audio scenery including a reliable reverberation estimate.

Audio scene analysis can thus for example feature parameter estimation such as the reverberation time of a given acoustic environment surrounding the device. The estimation of the reverberation time can be a challenge for acoustic experts as reliable estimation of the reverberation time in real-time applications and particularly for mobile devices with limited audio capture and computational resources is difficult. For example the estimation of reverberation time is typically computationally (heavy) requiring extensive processor power in order to produce real-time results.

The determination of the reverberation time is a fundamental cue not only in preparing audio scenery for example to augment audio content but also in audio processing and audio capture in real-time communication, for example in teleconferencing.

Audio processing functionality and performance, for example in a handsfree operation and especially for teleconference equipment can be improved when the audio context of the meeting room is known. For example noise suppression and audio beamforming algorithms can be tuned when the room reverberation time is known with sufficient accuracy.

Reverberation estimates have been typically conducted using mono audio systems whereby decaying audio events from a received signal are detected and the reverberation time from this event calculated. In some cases the estimator detects an impulse type sound event from which the decaying tail reveals the reverberation conditions of the environment. Furthermore in some estimators the estimator can detect signals which are slowly decaying by nature, wherein the observed decay rate is a combination of both the source signal decay and the environmental reverberation decay. The reverberation estimator typically assumes that the observed decay rate therefore provides an upper bound for the reverberation parameter, in other words when the decay rate of the actual source signal is not known the true reverberation time of the given space cannot be higher than the estimated parameter from the observed event. However finding a decaying signal tail is not straightforward, especially in circumstances where there is a continuous signal the reverberation tail or decay may be short and hidden within the short term signal structure and background noise.

Reverberation time estimators typically record a representative audio signal or monitor a given audio image. The received audio content is then analysed either within the device capturing the audio signal or the signal is transmitted to a more computationally complex device to conduct the reverberation time analysis and estimation.

Typically reverberation time (RT) is defined as the time taken by sound to decay 60 decibels (dB) below the initial level. The decay constant $\tau$ is related to the reverberation time using the equation RT=6.91 $\tau$.

There have been proposed two approaches to estimate reverberation time of a given space using only the available audio recordings. The first approach is to assume that the recorded audio is a function of the original sound source and the room response of the space including the reverberation. In this case the recorded signal can be written as $y(n)=\Sigma_k g(k)x(n-k)+v(n)$ where $x(n)$ is the true sound source signal, $g(k)$ is the room model and $v(n)$ is the measurement noise. Since the estimation process does not have knowledge of the true sound source, in other words the measurement is not taken on a sound source supplied in order to be tested, then the method is typically called "blind estimation".

To find the reverberation time the recorded signal is reviewed and searched for decaying tails within the signal. The energy level of the signal is determined by taking short frames of the audio signal and determining a beginning of an audio event when the short term energy level exceeds the average energy level. The succeeding frames following the beginning of an audio event are then stored in a buffer until the corresponding energy levels drop below the average background level. The audio event is then considered as being ended when the frame energy falls below the long term average energy value. The recorded audio signal buffer can then be analysed as a decaying tail of an audio event. The start time ($T_s$) of the decaying tail is determined by detecting the location after which the signal energy starts to decay or according to some examples using coherent information of the audio signal. The end time ($T_e$) of the event can also be determined as the point at which the energy level falls below the background noise level. When the start and end points are available a method such as defined in Schroeder (M. R. Schroeder "A new method of measuring a reverberation time", Journal of The Acoustical Society of America, Vol. 37, 1965) can be applied to therefore calculate the reverberation time.

The average of the squared decaying sound pressure at a point in the room excited by filtered white noise is equal to a certain integral over the squared impulse response $g^2(t)$ hence the decay ratio of the audio event can be calculated as an integral of the squared room response.

$$d^2(t) = N \int_t^{T_e} g^2(t) dt$$

The room impulse response can thus be determined by using equipment playing back band pass random pulses and recording the corresponding audio in a given room. However in practice the true signal which causes the detected audio event can be considered as an impulse. Hence the recorded signal can be applied as such to the room response signal. Where N from the above equation being considered to be proportional to the power spectral density of the noise in the measurement, the integration lower limit is t= $T_s, \ldots, T_e$.

The decaying rate of the decaying tail of the given audio event can now be defined by line fitting the achieved curve $d^2(t)$ within the interval $t=T_s, \ldots, T_e$. When the time difference of the start and stop points is known together with the decay rate it is known how to determine the decay time $\tau$ needed for a 60 dB drop in the signal energy.

However as described above this approach to estimate the decay time (and from this the reverberation time RT) is computationally complex and requires significant processing within the device to occur.

It has also been proposed to calculate the reverberation time by applying further model information whereby the decaying tail of an audio event is modelled as a function of a decaying factor $y(n)=a(n)^n x(n)$ in which $y(n)$ is the recorded audio signal, $x(n)$ is the audio signal source and $a(n)$ is the decay coefficient defined in the range of $a(n)=[0 \ldots 1)$. In other words that the range is asymptotically approaching unity. For example, the equation below indicates that $a(n)$ cannot reach unity at any value of "tau". In such a model the mapping between the decay factor $a(n)$ and the reverberation time can be defined as $a(n)=e^{(-1/\tau(n))}$.

The problem with both methods is that it requires significant processing capability of which is not typically available on a mobile device. Furthermore even at low sampling rates and with critically sampled band pass domain estimation the requirement in terms of instruction processing to generate a signal estimate is high.

In order to obtain a reliable estimate and detect a suitable audio event containing a proper decaying tail the analysis needs to be conducted over several seconds as a significant amount of sampled data has to be stored even before processing occurs. It has been proposed that a collaborative context analysis is used in which the detected audio component, in other words the recorded audio signals, are provided to a more sophisticated device such as another mobile device with more computational power or a server providing a corresponding reverberation time estimation service. In such proposals the audio signal is conveyed to the more sophisticated device as part of a communication. However such a process requires an initial encoding in order that the signal is to be transmitted and then a subsequent decoding with associated further processing requirements even before the analysis is started.

As such there appears to be significant problems with implementing either of the above reverberation estimation techniques.

SUMMARY OF THE INVENTION

This invention proceeds from the consideration that an efficient and reliable method for estimation of the reverberation time using binaural, stereo and multi-channel audio signals can be determined using encoded audio signals.

Embodiments of the present invention aim to address the above problem.

There is provided according to a first aspect of the present invention a method comprising: determining a reverberation time estimate for an audio signal from a first part of an encoded audio signal representing the audio signal.

Determining a reverberation time estimate from an encoded audio signal may further comprise: determining at least two candidate reverberation time values; determining an expectation value dependent on each of the candidate reverberation time values and the encoded audio signal; and selecting the candidate reverberation time value with the greatest expectation value as the reverberation time estimate.

Determining the expectation value may comprise: determining a decay factor from the candidate reverberation time value; and determining a likelihood the decay factor fits the first part encoded audio encoded audio signal.

The method may further comprise: selecting the first part of the encoded signal dependent on an activity indicator associated with the first part.

The encoded signal may further comprise a second part, each first part having an associated second part and the method may further comprise at least one of: selecting the first part of the encoded signal dependent on the associated second part having a value less than a first predetermined threshold value; and selecting the first part of the encoded signal dependent on the associated second part having an average value less than a further predetermined threshold value.

The second part may be at least one of: adaptive codebook gain; and Long Term Prediction gain.

The method may further comprise: determining a decaying encoded audio signal event; and selecting the first part of an encoded audio signal for the decaying encoded audio event.

The method may further comprise generating the encoded audio signal from the audio signal.

The method may further comprise receiving the encoded audio signal from an apparatus.

The first part of the encoded audio signal may comprise at least one of: fixed codebook gain; and excitation gain.

According to a second aspect of the present invention there is provided an apparatus comprising at least one processor and at least one memory including computer program code the at least one memory and the computer program code configured to, with the at least one processor, cause the apparatus at least to perform: determining a reverberation time estimate for an audio signal from a first part of an encoded audio signal representing the audio signal.

Determining a reverberation time estimate from an encoded audio signal may further cause the apparatus to perform: determining at least two candidate reverberation time values; determining an expectation value dependent on each of the candidate reverberation time values and the encoded audio signal; and selecting the candidate reverberation time value with the greatest expectation value as the reverberation time estimate.

Determining the expectation value may cause the apparatus to perform: determining a decay factor from the candidate reverberation time value; and determining a likelihood the decay factor fits the first part encoded audio encoded audio signal.

The apparatus may further perform: selecting the first part of the encoded signal dependent on an activity indicator associated with the first part of the encoded signal.

The encoded signal may further comprise a second part, each first part having an associated second part and the apparatus may further perform at least one of: selecting the first part of the encoded signal dependent on the associated second part having a value less than a first predetermined threshold value; and selecting the first part of the encoded signal dependent on the associated second part having an average value less than a further predetermined threshold value.

The second part may be at least one of: adaptive codebook gain; and Long Term Prediction gain.

The apparatus may further perform: determining a decaying encoded audio signal event; and selecting the first part of an encoded audio signal for the decaying encoded audio event.

The apparatus may further perform generating the encoded audio signal from the audio signal.

The apparatus may further be caused to perform receiving the encoded audio signal from an apparatus.

The first part of the encoded audio signal may comprise at least one of: fixed codebook gain; and excitation gain.

According to a third aspect of the invention there is provided apparatus comprising: a reverberation time estimator configured to determine at least one reverberation time estimate for an audio signal from a first part of an encoded audio signal representing the audio signal.

The reverberation time estimator may comprise: a candidate determiner configured to determine at least two candidate reverberation time values; an expectation determiner configured to determine an expectation value dependent on each of the candidate reverberation time values and the encoded audio signal; and a candidate selector configured to select the candidate reverberation time value with the greatest expectation value as the reverberation time estimate.

The expectation determiner may comprise: a decay factor determiner configured to determine a decay factor value from the candidate reverberation time value; and a likelihood determiner configured to determine a likelihood the decay factor fits the first part encoded audio encoded audio signal.

The reverberation time estimator may further comprise: an encoded signal selector configured to select the first part of the encoded signal dependent on an activity indicator associated with the first part of the encoded signal.

The encoded signal may further comprise a second part, each first part having an associated second part.

The reverberation time estimator may further comprise at least one of: a value selector configured to select the first part of the encoded signal dependent on the associated second part having a value less than a first predetermined threshold value; and an average value selector configured to select the first part of the encoded signal dependent on the associated second part having an average value less than a further predetermined threshold value.

The second part may be at least one of: adaptive codebook gain; and Long Term Prediction gain.

The reverberation time estimator may further comprise: a decaying event determiner configured to determine a decaying encoded audio signal event; and a decay event selector configured to select the first part of an encoded audio signal for the decaying encoded audio event.

The reverberation time estimator may further comprise an audio encoder configured to generate the encoded audio signal from the audio signal.

The reverberation time estimator may further comprise a receiver configured to receive the encoded audio signal from an apparatus.

The first part of the encoded audio signal may comprise at least one of: fixed codebook gain; and excitation gain.

According to a fourth aspect of the invention there is provided apparatus comprising: reverberation time estimation means for determining at least one reverberation time estimate for an audio signal from a first part of an encoded audio signal representing the audio signal.

The reverberation time estimator means may comprise: candidate means for determining at least two candidate reverberation time values; expectation means for determining an expectation value dependent on each of the candidate reverberation time values and the encoded audio signal; and selection means for selecting the candidate reverberation time value with the greatest expectation value as the reverberation time estimate.

The expectation means may comprise: decay factor means for determining a decay factor value from the candidate reverberation time value; and likelihood means for determining a likelihood the decay factor fits the first part encoded audio encoded audio signal.

The reverberation time estimator means may further comprise: encoded signal selector means configured to select the first part of the encoded signal dependent on an activity indicator associated with the first part of the encoded signal.

The encoded signal may further comprise a second part, each first part having an associated second part.

The reverberation time estimator means may further comprise at least one of: first selector means for selecting the first part of the encoded signal dependent on the associated second part having a value less than a first predetermined threshold value; and second selector means for selecting the first part of the encoded signal dependent on the associated second part having an average value less than a further predetermined threshold value.

The second part may be at least one of: adaptive codebook gain; and Long Term Prediction gain.

The reverberation time estimator means may further comprise: event determiner means for determining a decaying encoded audio signal event; and event selector means for selecting the first part of an encoded audio signal for the decaying encoded audio event.

The reverberation time estimator may further comprise encoder means for encoding the audio signal.

The reverberation time estimator may further comprise receiver means for receiving the encoded audio signal from an apparatus.

The first part of the encoded audio signal may comprise at least one of: fixed codebook gain; and excitation gain.

An electronic device may comprise an apparatus as described above.

A chip set may comprise an apparatus as described above.

According to a fifth aspect of the invention there is provided a computer program product configured to perform a method for decoding a speech signal, comprising: determining at least one reverberation time estimate for an audio signal from a first part of an encoded audio signal representing the audio signal.

The computer product may further perform determining at least two candidate reverberation time values; determining an expectation value dependent on each of the candidate reverberation time values and the encoded audio signal; and selecting the candidate reverberation time value with the greatest expectation value as the reverberation time estimate.

BRIEF DESCRIPTION OF DRAWINGS

For better understanding of the present invention, reference will now be made by way of example to the accompanying drawings in which.

DESCRIPTION OF EXAMPLE EMBODIMENTS OF THE INVENTION

The following describes in further detail possible mechanisms for the provision of reverberation estimation and reverberation estimation using coded audio signals. In this regard reference is first made to FIG. 1 which shows a schematic block diagram of an exemplary electronic device 10 or apparatus, which may incorporate suitable audio capture and encoding capacity according to some embodiments of the application and an exemplary reverberation estimator according to these embodiments. It would be appreciated that in some embodiments the reverberation estimator apparatus 50 and operations can be implemented within the electronic device 10.

The apparatus or electronic device 10 may for example be a mobile terminal or user equipment of a wireless communication system. In other embodiments the electronic device may be any audio player (such as an mp3 player) or media player (also known as an MP4 player), equipped with suitable processing capabilities. In other embodiments, the electronic device 10 can be a desktop computer, laptop computer, game device, digital camera/camcorder, television device, radio receiver, digital video recorder, positioning device, wrist watch, portable digital assistant (PDA), any combination thereof, and/or the like, equipped with suitable microphone.

Figure 1:
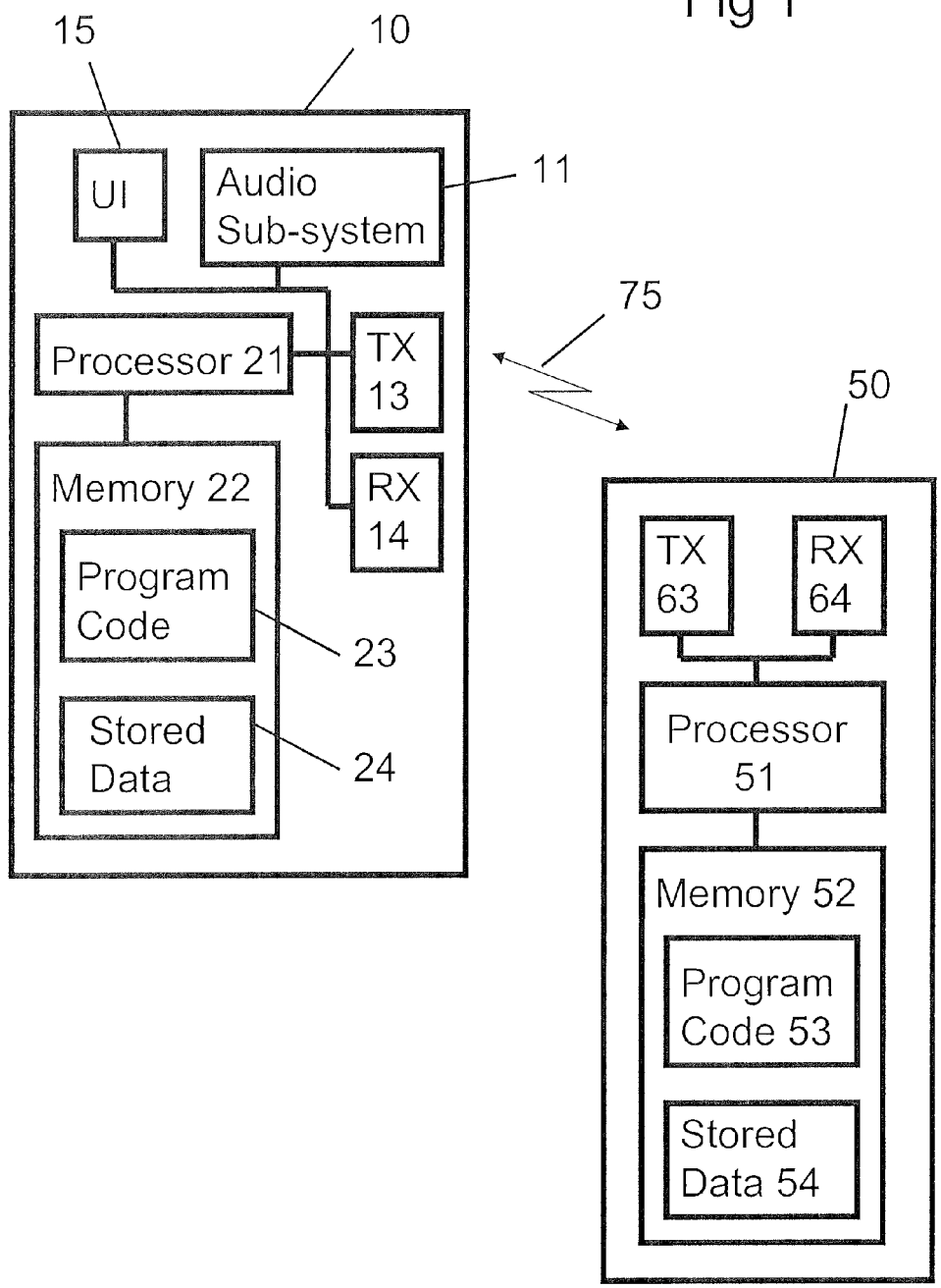
FIG. 1 shows schematically an electronic device and reverberation estimation apparatus suitable for employing embodiments of the application.

The apparatus 10 in some embodiments comprises a processor 21, a user interface (UI) system 15, an audio sub-system 11, a transmitter 13, a receiver 14, and memory 22 all electronically linked or connected such that data can be passed between at least pairs of the above. Thus in some embodiments as shown in FIG. 1 the processor 21 is linked to the UI 15, audio sub-system 11, transmitter 13, and receiver 14 using a first connection and the processor 21 is further linked to the memory 22 using a second connection. However it would be appreciated that any number or arrangement of network connections can be suitably used.

The processor 21 in some embodiments is configured to execute various program codes. The implemented program codes may comprise an audio encoding code or speech encoding code. The implemented program codes in some embodiments can be stored for example in the memory 22 and specifically within a program code section 23 of the memory 22 for retrieval by the processor 21 whenever needed. The memory 22 could in some embodiments further provide a stored data section 24 for storing data, for example data that has been encoded.

The apparatus 10 in some embodiments comprises an audio sub-system 11. In some embodiments the audio sub-system 11 comprises a microphone, which is linked via an analogue-to-digital converter (ADC) to the processor 21. Furthermore in some embodiments the audio sub-system 11 comprises a digital-to-analogue converter (DAC) and loudspeaker(s), from which the processor 21 can output an audio signal. The loudspeaker can be any suitable audio transducer configuration for example at least one of an earpiece, an integrated handsfree transducer (IHF), a headset.

The apparatus 10 in some embodiments comprises a user interface 15 enabling a user to input commands to the apparatus 10, for example via a keypad, and/or to obtain information from the apparatus 10, for example via a display. In some embodiments the display and data entry components can be combined by the use of a touch screen interface capable of both displaying information and accepting user input.

The apparatus 10 furthermore in some embodiments comprises a transmitter Tx 13 and receiver Rx 14 capable of enabling communication with other electronic devices, for example via a wireless communication network 75. In some embodiments the transmitter 13 and receiver 14 operations can be implemented in a transceiver Tx/Rx. In the following examples the other electronic device can be as seen in FIG. 1 a separate reverberation estimator apparatus 50, however the reverberation estimator apparatus can be implemented within any suitable device or entity in data connection with the electronic device 10. Thus the wireless communication network 75 shown in FIG. 1 can in some embodiments represent schematically a communications link or links within any suitable data communications network. For example in some embodiments the communication network can be a universal mobile telecommunications system (UMTS) and the reverberation estimator apparatus 50 implemented within a server physically located away from operator of the apparatus 10.

It is to be understood again that the structure of the apparatus 10 could be supplemented and varied in many ways.

The reverberation estimator apparatus 50 furthermore comprises a processor 51, a memory 52, a transmitter 63 and a receiver 64 all connected together such that data can be passed between the processor and the memory, and the processor and the transmitter and/or receiver.

The processor 51 in some embodiments is configured to execute various program codes. The implemented program codes can comprise a reverberation estimation code or decay parameter estimation code in some embodiments of the application. The implemented program codes in some embodiments can be stored for example in the memory 52 within a program code section 53 for retrieval by the processor 51 whenever needed. The memory 52 could in some embodiments further provide a stored data section 54 for storing data, for example encoded audio data received via the receiver 54 or stored reverberation time estimates to be transmitted by the transmitter 53 at a later time.

The reverberation estimation apparatus 50 further comprises a transmitter 63 and receiver 54 capable of enabling communication with other electronic devices, for example via a wireless communications network 75 to the electronic device or apparatus 10. In some embodiments as described previously the wireless communications network 75 shown in FIG. 1 can represent schematically a communications link or links within any suitable data communications network or device.

Furthermore it is understood that the structure of the reverberation estimation apparatus 50 could be supplemented and varied in many ways. For example the reverberation estimation apparatus 50 can in some embodiments be part of a server or processor configuration of which the operation of reverberation estimation is only a part.

Figure 2:
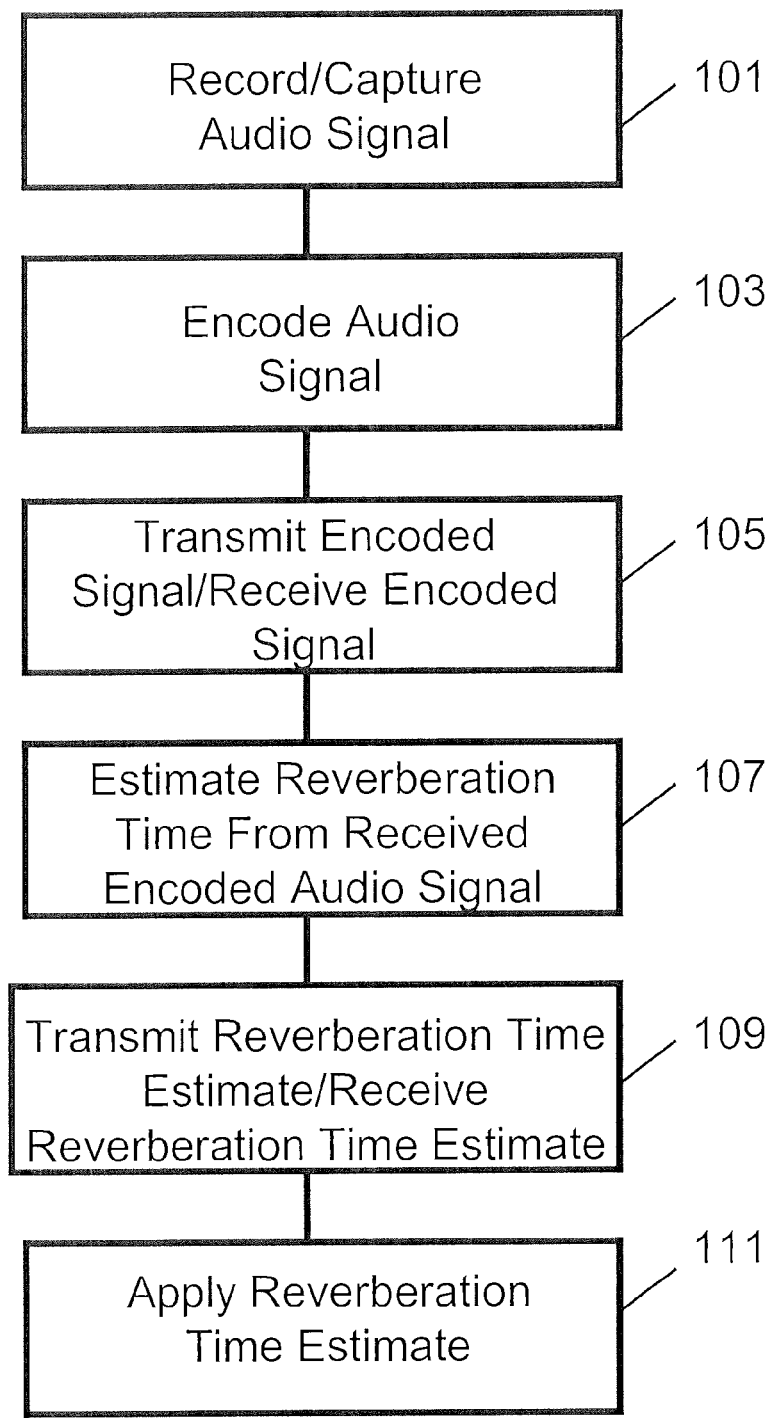
FIG. 2 shows schematically an overview of the operation of the reverberation estimation apparatus and electronic device as shown in FIG. 1 according to embodiments of the application.

With respect to FIGS. 1 and 2 a schematic overview of the apparatus and method of reverberation time estimation according to some embodiments is described. A user of the electronic device 10 in some embodiments uses the audio subsystem 11 and specially the microphone for inputting audio signals. In some embodiments the audio subsystem 11 further comprises an analogue-to-digital converter configured to convert the input analogue audio signal from the microphone into a digital audio signal suitable to be provided to the processor 21. In some embodiments the microphone within the audio subsystem is a solid state microphone, in other words the microphone can be considered to be a microphone with an integrated analogue-to-digital converter capable of providing a digital audio signal to a processor 21.

The operation of recording or capturing the audio signal is shown in FIG. 2 by step 101.

The processor 21 in such embodiments is configured to receive the digital audio signal and encode the digital audio signal in such a form that it can be transmitted or passed by the transmitter 13 over the wireless communication link 75.

In some embodiments the processor 21 can temporarily store or buffer the digital audio signal within the memory 22 and specifically the stored data section 24 of the memory 22. The processor 21 is configured in some embodiments to retrieve from memory 22 or from some other source instructions on how to encode the audio signal. In some embodiments the processor 21 is configured to encode the audio signal using a prediction based coding system. The processor 21 in some other embodiments can be configured to process the digital audio signal in any suitable form.

In the following examples the processor 21, or some encoding means or encoder is configured to encode the digital audio signal using a code excited linear prediction (CELP) encoder as a core encoder layer. However any suitable CELP or CELP derived encoding process could be suitably implemented including but not exclusively multiple layer encoding, wideband encoding, super wideband encoding. In such embodiments the CELP encoder operations performed by the processor 21 can be considered to be a core encoding or core encoder process upon which any extended bandwidth layers can be based.

The processor 21 in such embodiments is configured to receive the digital audio signal to be encoded and output encoded parameters which represent the core layer encoded audio signal. Furthermore in some embodiments the processor 21 can be configured to also output a synthesised audio signal (in other words the audio signal is encoded into parameters and then the parameters are decoded using a reciprocal process to the encoding process to produce a synthesised audio signal for such embodiments which propose further layer encoding of the signal above the core encoding range. In some embodiments the processor 21 can perform a pre-processing operation prior to the core layer encoding process whereby the received digital audio signal sampled at a first frequency is down-sampled or decimated in order to reduce the number of samples being encoded.

For example if the input signal is originally sampled at 16 kHz, the signal can in some embodiments be down-sampled to 8 kHz using a linear phase finite impulse response (FIR) filter with a 3 dB cut-off at approximately 3.6 kHz and then decimating the number of samples by a factor of 2. Furthermore the processor 21 can implement a frame based encoding whereby the digital audio signal is divided into groups of samples or frames which are processed on a frame by frame basis. The frames can in some embodiments overlap in scope such that at least one sample of the audio signal is in at least two separate frames.

The processor 21 therefore in some embodiments receives the digital audio signal and uses any appropriate encoding technique to produce a series of code parameters to represent the audio signal. For example in some embodiments the processor 21 performs code excited linear prediction encoding (CELP) on the digital audio signal after it has been divided into frames and is configured to output code excited linear prediction parameters to represent each frame of the digital audio signal. The CELP encoder can in some embodiments thus output linear prediction calculation (LPC) parameters which in some embodiments may be quantized in line spectral pair (LSP) or immittance spectral pair (ISP) domain forms describing the spectral content, long-term prediction parameters (LTP) describing the periodic structure LPC gain parameters, LTP gain parameters and residual signal values.

In some embodiments the processor 21 can comprise a two-stage cascade code excited linear prediction (CELP) coder such as variable rate multi mode encoding (VMR) which is capable of producing R1 (or core layer) and/or R2 (or wideband layer 2) bit streams at 2 kbit/s and/or 12 kbits/s respectively. In some embodiments the processor 21 is configured to have a single speech coding stage such as a G.729 encoder as defined by the International Telecommunications Union Standardisation Section (ITU-T) Standard.

It would be appreciated that the processor 21 could in some embodiments produce further parameters during encoding the audio signal.

The operation of encoding the audio signal is shown in FIG. 2 by step 103.

The processor 21 having encoded the audio signal in some embodiments can store the encoded audio signal in the memory 22 and in particular the stored data memory 24 prior to transmission via the transmitter 13 over the wireless communications link 75. However in some other embodiments the processor 21 can be configured to transmit the encoded audio signal together with or as part as a telephone communication. In such embodiments the encoded audio signal is typically passed via the wireless communication system 75 to a further device for example a further apparatus where the audio signal can be decoded and presented to a second or further user via an appropriate audio subsystem.

In some embodiments the encoded audio signal is further sent or passed via the reverberation time estimator 50. The reverberation time estimator 50 and particularly the receiver 64 of the reverberation time estimation apparatus 50 is configured to receive the audio encoded signal and in embodiments of the application estimate a reverberation time or decay constant based on the parameters passed to it as part of the encoded audio signal. The operation of passing the encoded signal is shown in FIG. 2 by step 105.

The protocol and transmission system between the transmitter 13 of the apparatus 10 and the receiver 64 of the time reverberation estimation apparatus 50 can be any suitable protocol. As described above the protocols and system used in the following examples are, but not exclusively only, those specified by universal mobile telecommunications service (UMTS) standards.

The received encoded audio signal is passed to the processor 51 of the audio reverberation time estimation apparatus 50. The processor 51 is configured to generate the estimate of the reverberation time from the received encoded audio signal. The operation of estimating the reverberation time from the received encoded audio signal is shown in FIG. 2 by step 107 and will be described in further detail with respect to FIGS. 3 to 8.

The generated estimate for the reverberation time can then in some embodiments be passed from the processor 51 to the transmitter 63 of the reverberation estimation apparatus 50. The transmitter 63 is then configured to pass the reverberation time estimate back to the apparatus 10. The passing of the reverberation time estimate to the apparatus 10 can in some embodiments be carried out using the reciprocal communications path or channel to the communications path used to pass the encoded audio signal to the audio reverberation time estimation apparatus 50. The apparatus 10 receiver 14 is furthermore configured to receive the reverberation time estimate and pass the reverberation time estimate to the processor 21 of the apparatus 10.

The operation of passing the reverberation time estimate from the reverberation time estimation apparatus 50 to the apparatus 10 is shown in FIG. 2 by step 109.

The apparatus 10 processor 21 can in some embodiments be configured to store the reverberation time estimate within the memory 22 stored data section 24. Furthermore in some embodiments the reverberation time estimate can be used by the apparatus 10 processor 21 for example in improving audio beam forming operations for telecommunications such as teleconference systems using handsfree devices and also in virtual reality audio layering to provide an audio layer which matches the environmental conditions.

The operation of applying the reverberation time estimate is shown in FIG. 2 by step 111.

In some embodiments the apparatus 10 and time reverberation apparatus are implemented within the same device or apparatus. In such embodiments the parameters are not transmitted external to the device before the reverberation time estimation. Furthermore in some of such embodiments some components from the apparatus 10 and time reverberation apparatus could be implemented by fewer components. For example the apparatus 10 processor 21 and time reverberation apparatus 50 processor 51 could be implemented by a processor for carrying out the actions as described hereafter. Similarly the apparatus 10 memory 22 and time reverberation apparatus 50 memory 52 could be implemented by a memory for storing instructions and/or data.

In such embodiments local time reverberation estimation can therefore be employed. This in some embodiments can be carried out in addition to transmitting the parameters to a far end device. In some embodiments the far end device can furthermore carry out estimation regardless of the local or transmitting apparatus and the bit stream output is not affected by the local estimator.

As described later, as there is no need to decode the signal into actual speech/audio signal components when conducting the estimation process the complexity required is not necessarily too great for the apparatus to implement.

Furthermore in some embodiments the reverberation estimation apparatus or method can be implemented in network apparatus between a transmitting and a receiving terminal. In such embodiments the network element can read the bit stream output from the apparatus and determine the reverberation time estimation. In such embodiments the network element implementing the reverberation estimation can provide the estimation result in both directions, in other words to the local apparatus (transmitting device) as well as to the far apparatus (receiving device). In some other embodiments the estimation result when determined by the network element can store the results and to be used in the network element only.

Figure 3:
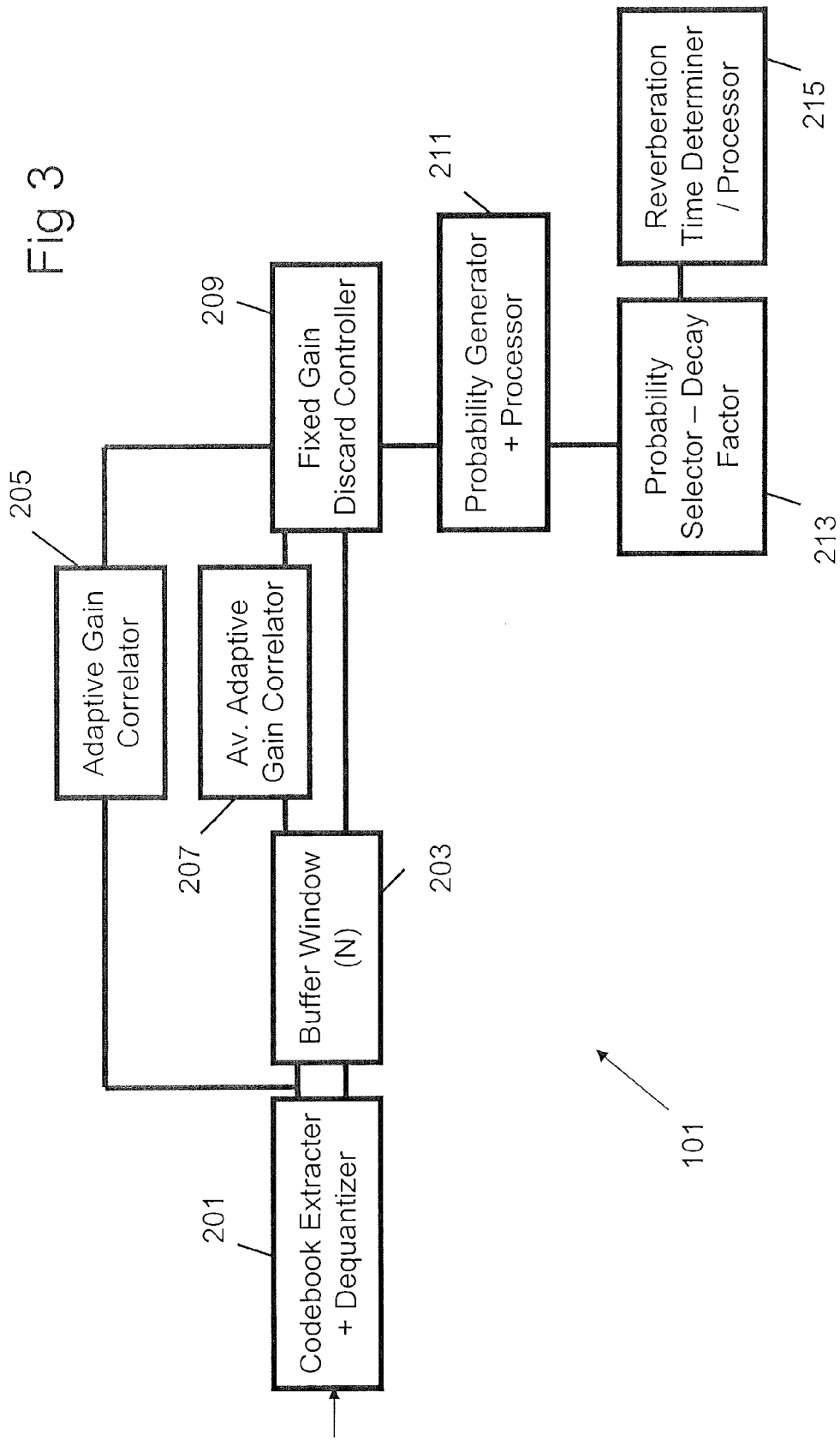
FIG. 3 shows schematically a reverberation estimator according to some embodiments of the application.
Figure 4:
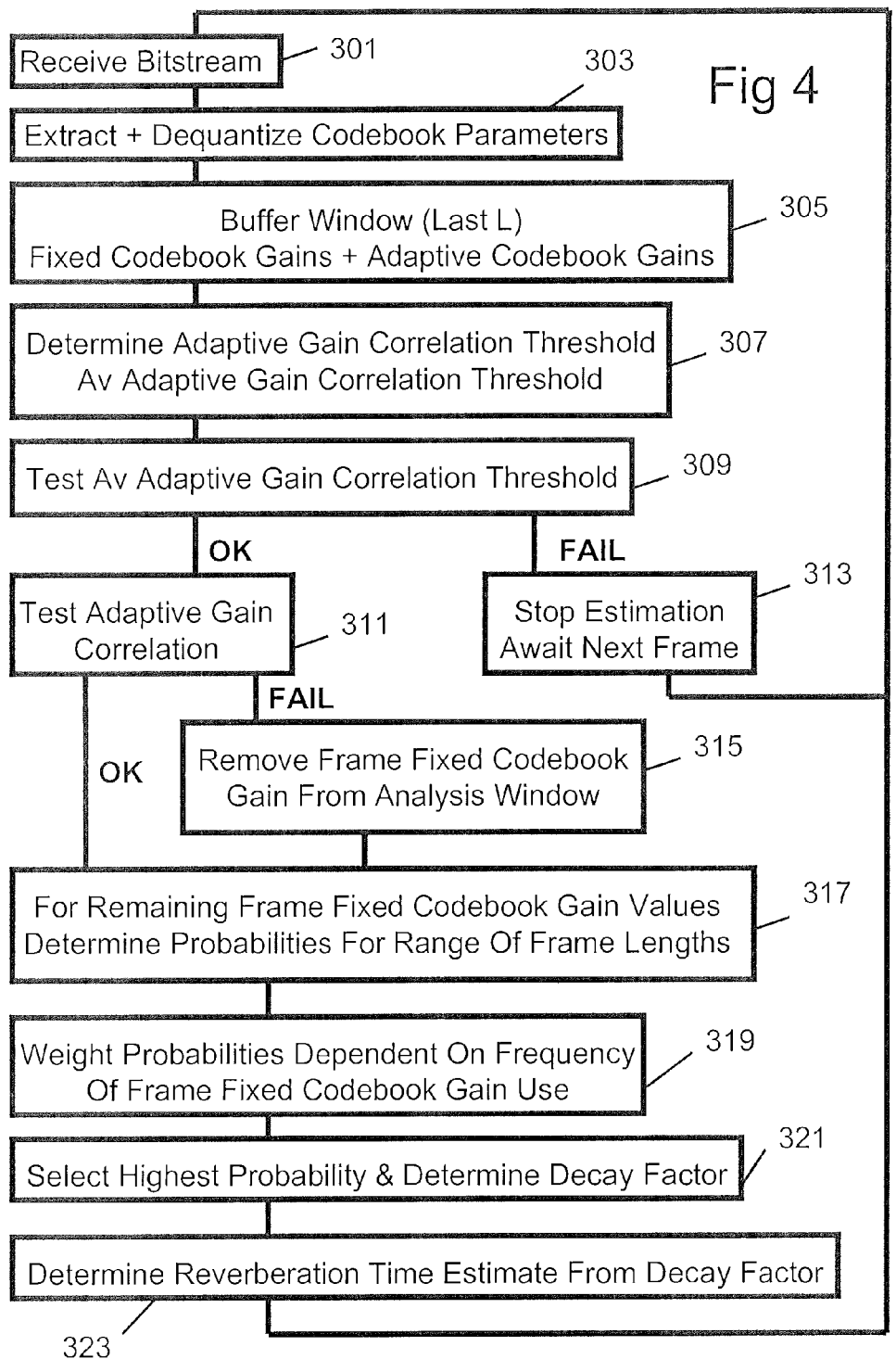
FIG. 4 shows a flow diagram illustrating the operation of the reverberation estimator shown in FIG. 3 according to some embodiments of the application.
Figure 5:
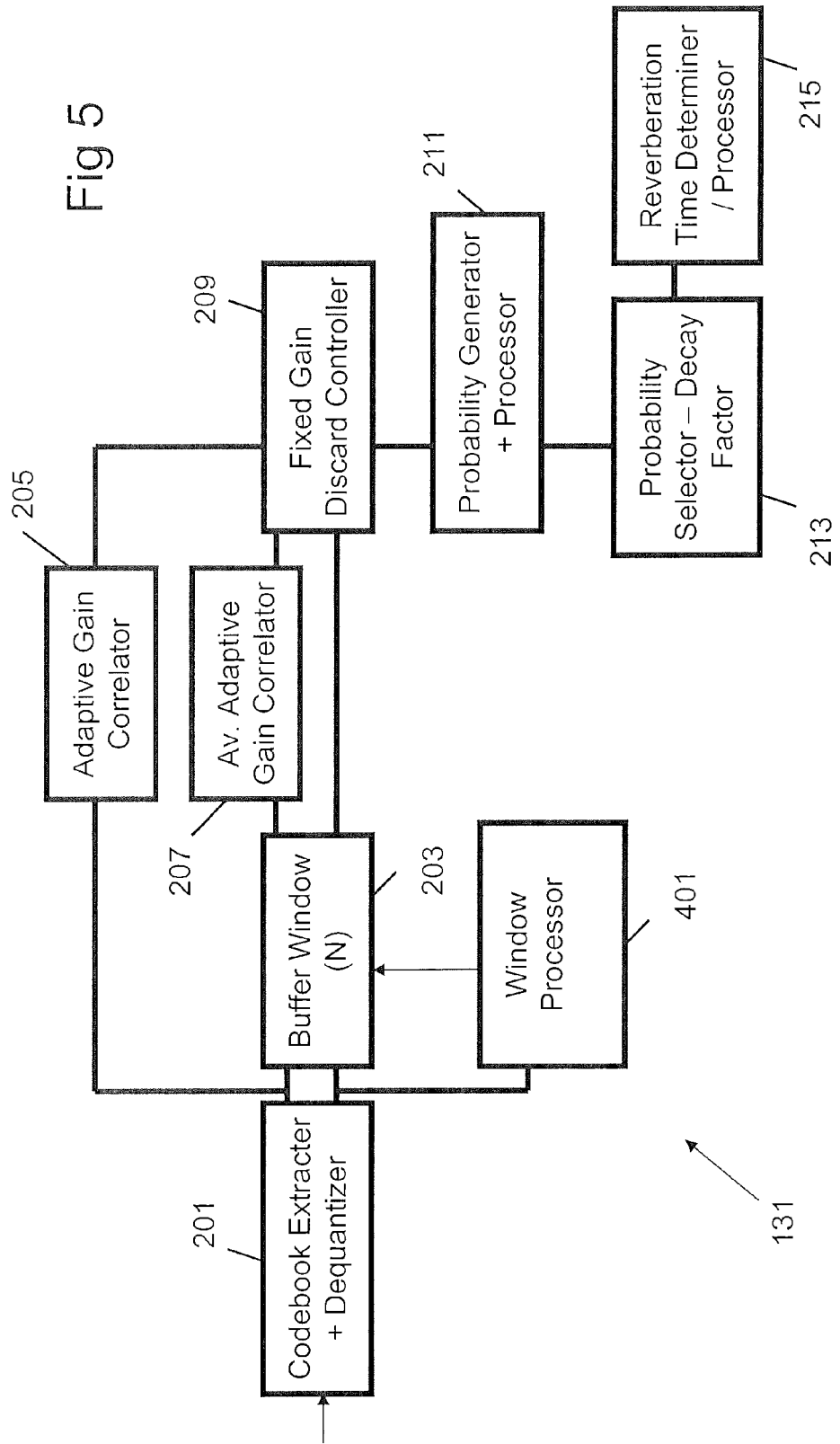
FIG. 5 shows schematically a further reverberation estimator according to some embodiments of the application.
Figure 6:
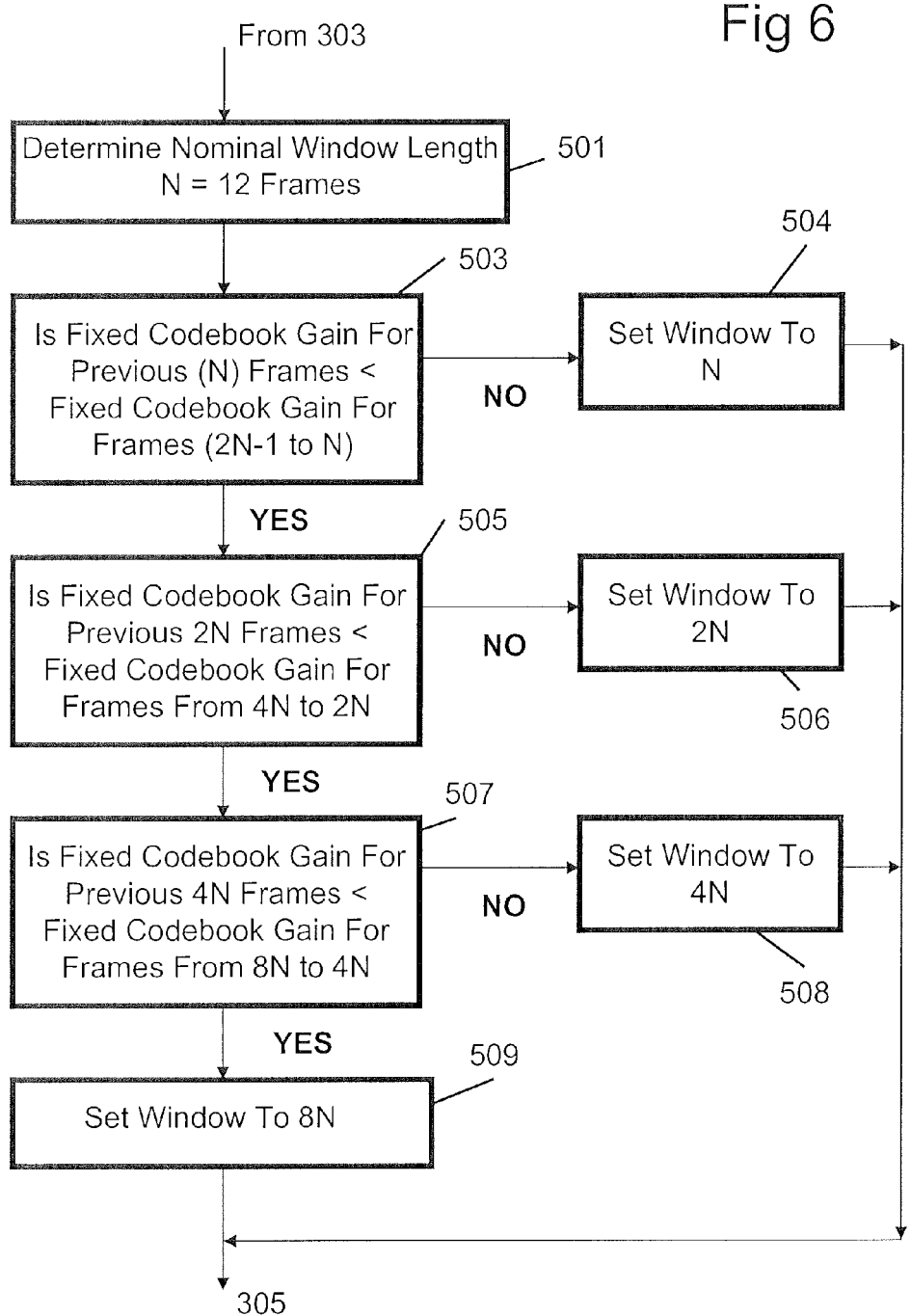
FIG. 6 shows a flow diagram illustrating some further operations of the further reverberation estimator shown in FIG. 5 according to some embodiments of the application.
Figure 7:
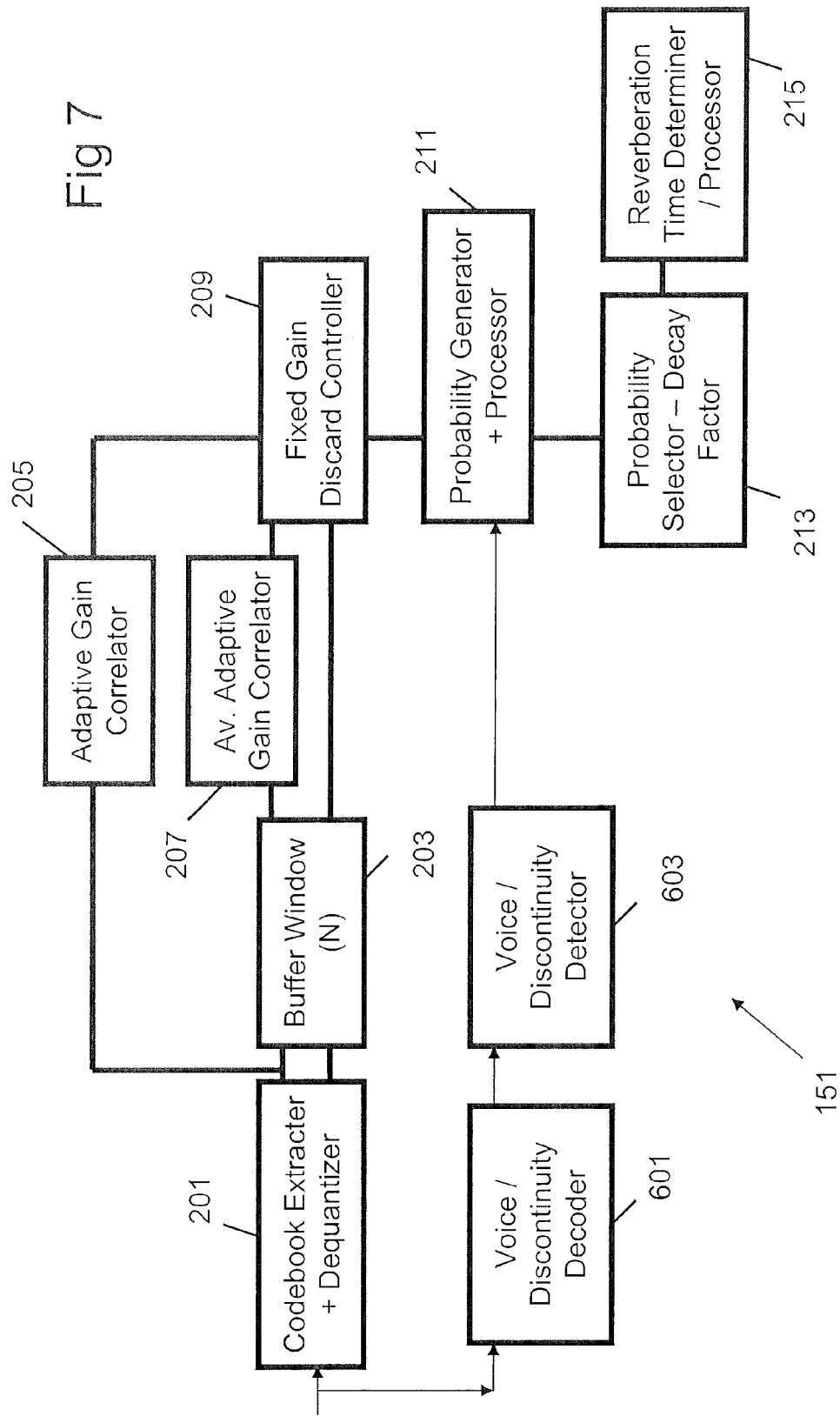
FIG. 7 shows schematically another reverberation estimator according to some embodiments of the application.
Figure 8:
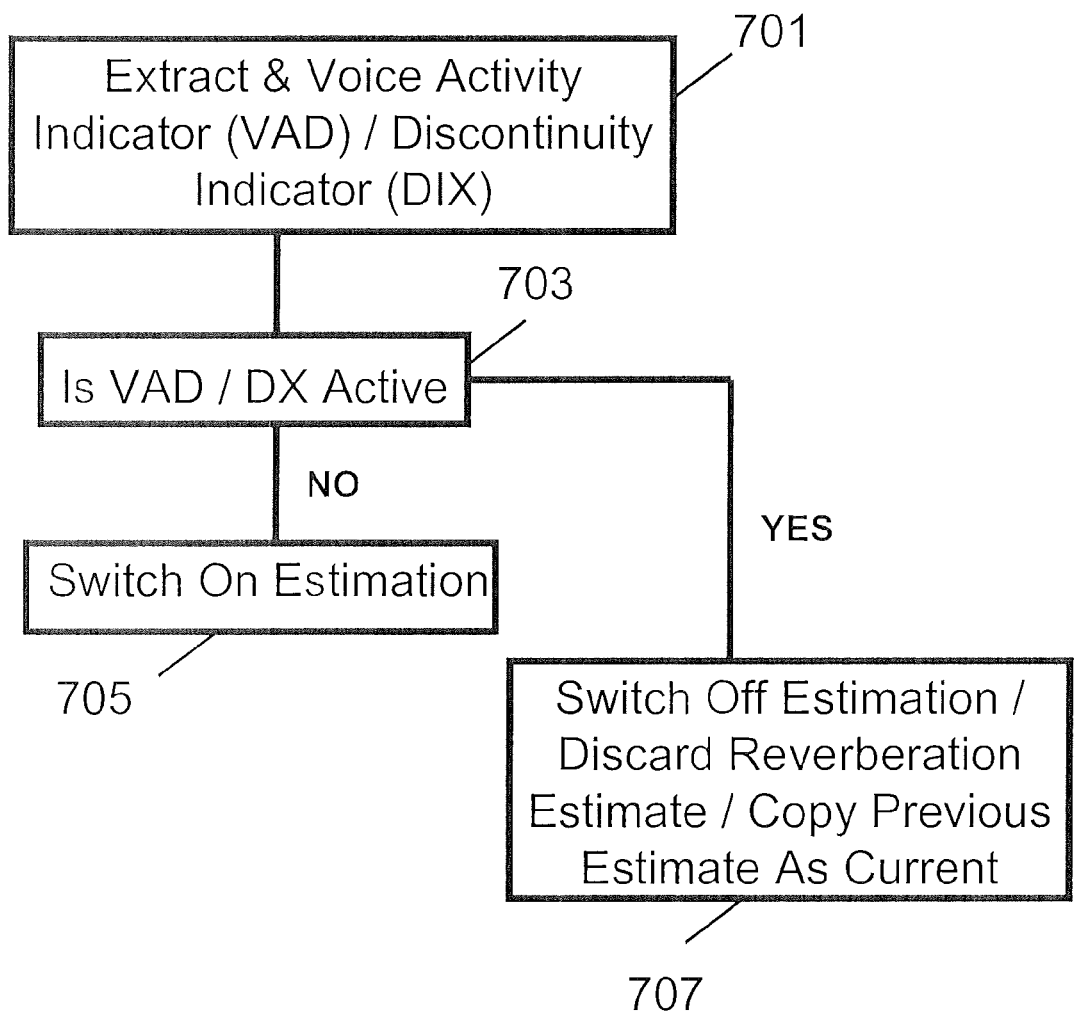
FIG. 8 shows a flow diagram illustrating some further operations of another reverberation estimator shown in FIG. 7 according to some embodiments of the application.

It would be appreciated that the schematic structures described in FIGS. 3, 5 and 7 and the method steps shown in FIGS. 4, 6 and 8 represent only a part of the operation of a complete audio reverberation estimation apparatus system as shown implemented in the system shown in FIG. 1 and described with respect to the reverberation time estimate shown in step 107 in FIG. 2. Specifically with regards to FIGS. 3 and 4 the systematic structure of a reverberation time estimator using encoded (and particularly CELP encoded) audio signals is described with respect to some embodiments of the application. With respect to FIG. 3 a reverberation time estimator 101 is shown. The reverberation time estimator 101 can in some embodiments be implemented as a program or code operating in the processor 51 and stored in the program code memory 53. In some embodiments the reverberation time estimator 101 can be implemented at least partially in hardware or firmware.

The reverberation time estimator 101, or reverberation time estimator means in some embodiments comprises a codebook extractor and de-quantizer 201. The codebook extractor and de-quantizer 201 in such embodiments receives the bit stream passed from the receiver 64. The receiver as discussed can be any suitable receiving means.

The operation of receiving the bit stream is shown in FIG. 4 by step 301.

The codebook extractor and dequantizer 201 in such embodiments is specifically concerned with extracting and de-quantizing at least the parameters of the excitation gain parameter $g_{cb}(n)$, and the adaptive codebook book gain parameter $g_{ac}(n)$. The excitation gain parameter is also known as the fixed codebook gain and contains at least some of the decay information of the audio signal. As such the codebook extractor and dequantizer 201 can for each frame of the encoded audio signal extract and dequantize gain values according to any suitable extraction and de-quantization process. The excitation gain parameter $g_{cb}$ for each frame is, in some embodiments, passed to the buffer 203 and also to the adaptive gain correlator 205. The adaptive codebook gain for each frame, in other words the long term prediction gain value, can in some embodiments be passed by the codebook extractor and de-quantizer to the buffer 203.

The operation of extracting and de-quantizing codebook parameters for the current frame is shown in FIG. 4 by step 303.

In some embodiments the reverberation time estimator 101 further comprises a buffer 203 (or in some embodiments a pointer to a separate memory buffer) wherein values of the fixed codebook gain $g_{cb}$ and the adaptive or long term prediction gain $g_{ac}$ for a series of frames are stored. The buffer 203 stores the gain values for at least a number of frames which may be defined as the window length. The window length in some embodiments is 12. In other words the current frame and the previous 11 frames of gain parameter values are stored in the buffer 203. However it would be appreciated that in some embodiments more than or less than 12 frames may be stored and used as the window or for the analysis of the reverberation time estimation.

Where, in this example, the window length is 12 frames, this would practically represent a window length of approximately 60 milliseconds if the audio signal had originally been sampled at 16 kHz and each frame is 5 milliseconds long.

The output of the buffer 203 can be passed to the average adaptive gain correlator 207 and the fixed codebook gain discard controller 209.

The buffering of the fixed codebook gain and the adaptive codebook gain for the window length is shown in FIG. 4 by step 305.

It would be appreciated that the adaptive or long term prediction gain parameter contributes to the decoded signal energy level (as well as the fixed codebook excitation gain). For example a strongly periodic sound generates an adaptive codebook parameterization, where the long term prediction (LTP) lag and gain dominates while the fixed codebook gain contribution is marginal. In such examples the adaptive or long term prediction gain $g_{ac}$ can be used when estimating the decay time since the decay is mainly dependent on it. It would be appreciated that according to conventional CELP encoding the adaptive codebook gain value (LTP gain) is typically in the range of $g_{ac}(n)=\{0, \ldots, 1.3\}$. Values of $g_{ac}$ close to 0 indicate quickly decaying contributions from the adaptive codebook resulting in a decaying output signal level whereas long term prediction (LTP gain) of $g_{ac}$ values close to unity indicate sustaining or increasing output signal levels. Furthermore a high LTP gain value is indicative of a periodic or voice signal which by definition is different to the reverberating or decaying tail of scattered signals from multiple directions that are useful to detect in order to determine the reverberation time value.

As a high value LTP gain even when the overall signal level is decaying could be indicative of a direct sound recording in other words from the source to the recording microphone without a reverberation component, any estimation of the reverberation time would not be a true estimation of the environmental reverberation time.

In some embodiments the reverberation time estimator further comprises an average adaptive gain correlator 207. The average adaptor gain correlator 207 receives the values of the adaptive codebook gain (LTP gain) values over the buffer window period to determine whether or not this is a direct correlation between the transducer and microphone over a number of frames. The average adaptive gain correlator 207 generates an average adaptive gain value by "windowing" the frame adaptive codebook gain values together. Furthermore this "windowed" combination of the adaptive codebook gain is then also compared against an average threshold value. This "windowing" can in some embodiments be a simple averaging of the adaptive codebook gain values. However it would be appreciated that in some embodiments a weighted averaging or uniform or non-uniform windowing of the adaptive codebook gains.

The average threshold value $g_{acta}$ in some embodiments can be 0.6. However the threshold value can be any suitable value and in some further embodiments can be an adaptive value.

The determination of the average adaptive gain threshold value is shown in FIG. 4 as step 307.

The testing of the average adaptive gain against a threshold is shown in FIG. 4 by step 309.

Where the test shows that the average adaptive gain against the threshold value is greater than the threshold value, the average adaptive gain correlator 207 can in some embodiments pass an indicator to the fixed codebook gain discard controller 209 to instruct the fixed codebook gain discard controller to stop the estimation for the current frame and await the next frame as the estimate of the reverberation time would be of a direct rather than reverberation audio signal and thus produce a poor estimate.

In some embodiments the reverberation time estimator 101 further comprises an adaptive gain correlator 205. As described previously the adaptive gain correlator 205 receives the adaptive codebook gain parameters from the codebook extractor and de-quantizer 201.

The adaptive gain correlator 205 is thus configured to determine from the output of the codebook extractor and de-quantizer 201 and particularly the adaptive codebook gain value $g_{ac}$ whether or not there is a direct correlation between the transducer and microphone for the current frame value. For example in some embodiments the adaptive gain correlator 205 is configured to determine whether or not the adaptive LTP gain parameter $g_{ac}$ is greater than a predefined threshold value. For example in some embodiments the threshold value can be set to a value of 0.6. However it would be appreciated that values greater than or less than 0.6 can be used as threshold values. In some embodiments these threshold values may be adaptable.

The setting of the threshold value is shown in FIG. 4 in step 307.

The adaptive gain correlator 205 in such embodiments can be configured to firstly determine the adaptive codebook gain value $g_{ac}$ for the current frame and then test the adaptive gain value $g_{ac}$ against a threshold value $g_{act}$. Where the current frame value fails the threshold test, the fixed codebook gain for the current frame is removed from the analysis window. This for example may be achieved in the adaptive gain correlator 205 by passing an indicator to the fixed codebook gain discard controller 209 to discard the current frame fixed codebook gain value, as the failing of the test would indicate that the current audio signal frame is likely to contain direct recording values and therefore produce poor estimates.

The operation of testing the adaptive gain correlation value is shown in FIG. 4 by step 311.

The reverberation time estimator in some embodiments further comprises a fixed codebook gain discard controller 209. The fixed codebook gain discard controller 209 is configured to receive the fixed codebook gain buffer values from the buffer for the analysis window and the indicators from the adaptive codebook gain correlator 205 and the average adaptive codebook gain correlator 207. As described previously where the average adaptive codebook gain correlator 207 indicates that the average adaptive codebook gain value is greater than a predetermined threshold value, the fixed codebook gain discard controller can be configured to stop the estimation process (or discard all of the values passed to it via the buffer 203) and await the next frame.

This as described previously is shown in FIG. 4 by the step 313.

Thus the apparatus can in some embodiments be considered to comprise a first selector means for selecting the first part of the encoded signal, the fixed codebook gain values, to be passed for analysis dependent on the associated second part, the adaptive codebook gain value, having a value less than a first predetermined threshold value.

Similarly the apparatus can in some embodiments be considered to comprise a further selector means for selecting the first part of the encoded signal, the fixed codebook gain values, to be passed for analysis dependent on the associated second part, the adaptive codebook gain value, having an average value less than a further predetermined threshold value.

Furthermore where the adaptive gain correlator 205 provides an indicator to the fixed gain discard controller 209 that the adaptive gain correlation for the current frame is greater than the current frame threshold value then the fixed gain discard controller 209 can be configured to remove the current frame fixed codebook gain $g_{cb}$ (the excitation gain) received from the buffer 203 when passing the fixed gain values from the buffer 203 to the probability generator and processor 211. Furthermore in some embodiments the adaptive gain correlator 205 can stop the estimation process as well for the buffer containing the discarded fixed codebook gain. Furthermore the adaptive gain correlator 205 in some embodiments can control the buffer (analysis window) to refill with new parameters from the bit stream before further estimation is performed.

This removal of the current frame fixed codebook gain value is shown in FIG. 4 by the step 315.

The reverberation time estimator 101 in some embodiments further comprises a probability generator and processor 211. The probability generator and processor 211 is configured to receive the fixed codebook gain values within the analysis window passed by the fixed codebook gain discard controller 209. The probability generator and processor 211 is configured to generate a series of probability estimates for the window using the fixed codebook gain values passed to it.

The estimation model can be described with regards to a decaying factor between the codebook gain and the sound source signal fixed codebook gain according to the following equation:

$$g_{cb}(n) = a^n g_o(n),$$

in which $g_o(n)$ is the excitation gain for the true sound source signal and $g_{cb}(n)$ is the fixed codebook gain as described above. Where the time varying nature of the decaying factor $a(n)$ and the fixed codebook value $g(n)$ is independent with a probability distribution of $N(0, \sigma a^n)$ a joint probability density function for a sequence of observations $n=0, \ldots, N-1$, where N is the analysis window length can be written as $$P(g; a, \sigma) = \frac{1}{a(0) \ldots a(N-1)} \left(\frac{1}{2\pi\sigma^2}\right)^{\frac{N}{2}} \exp\left(-\frac{\sum_{n=0}^{N-1} (g(n)/a(n))^2}{2\sigma^2}\right)$$

The time independent decay factor $a(n)$ in the above expression can be considered to be a constant over the analysis window (in other words a scalar parameter rather than a vector of length N) if the window is sufficiently short as to not cause a large environmental shift. In such examples the joint probability function can be written as $$P(g; a, \sigma) = \left(\frac{1}{2\pi a^{(N-1)}\sigma^2}\right)^{\frac{N}{2}} \exp\left(-\frac{\sum_{n=0}^{N-1} a^{-2n} g^2(n)}{2\sigma^2}\right)$$

The likelihood function described above is as such solely defined by the decaying factor a and the standard deviation σ. Taking the logarithm of the above expression generates a log-likelihood function which can be written as:

$$L(g; a, \sigma) = -\frac{N(N-1)}{2}\ln(a) - \frac{N}{2}\ln(2\pi\sigma^2) - \frac{1}{2\sigma^2}\sum_{n=0}^{N-1} na^{-2n} g^2(n)$$

The partial derivatives of the log likelihood function L with respect to the factors a and the standard deviation σ are $$\frac{\partial L(g; a, \sigma)}{a} = -\frac{N(N-1)}{2a} + \frac{1}{2\sigma^2}\sum_{n=0}^{N-1} na^{-2n} g^2(n)$$

$$\frac{\partial L(g; a, \sigma)}{\sigma} = -\frac{N}{\sigma} + \frac{1}{\sigma^3}\sum_{n=0}^{N-1} a^{-2n} g^2(n)$$

The maximum of the log likelihood function according to the above is achieved when the partial derivatives are 0. Thus setting the two above partial derivatives to 0 we get the mathematical functions as follows:

$$-\frac{N(N-1)}{2a} + \frac{1}{2\sigma^2}\sum_{n=0}^{N-1} na^{-2n} g^2(n) = 0$$

$$\frac{1}{N}\sum_{n=0}^{N-1} a^{-2n} g^2(n) = \sigma^2$$

When the decay factor a is known the standard deviation a can thus be solved for a given data set using the above equation. However the above expression $$-\frac{N(N-1)}{2a} + \frac{1}{2\sigma^2}\sum_{n=0}^{N-1} na^{-2n} g^2(n) = 0,$$

can only be solved iteratively. The solution in terms of implementing within the probability generator 211 is thus to be substitute the following $$\frac{1}{N}\sum_{n=0}^{N-1} a^{-2n} g^2(n) = \sigma^2$$

into the log-likelihood function, $$L(g; a, \sigma) = -\frac{N(N-1)}{2}\ln(a) - \frac{N}{2}\ln(2\pi\sigma^2) - \frac{1}{2\sigma^2}\sum_{n=0}^{N-1} na^{-2n} g^2(n)$$

and find the decaying factor that maximise the likelihood described by the following expression, $$L(g; a_i) = -\frac{N(N-1)}{2}\ln(a_i) - \frac{N}{2}\ln\left(\frac{2\pi}{N}\sum_{n=0}^{N-1} a_i^{-2n} g^2(n)\right) - \frac{N}{2}.$$

The best estimate for the decaying factor is found when we select the value of a to be $$a = \arg\max\{L(g; \hat{a}_i)\}$$

The decaying factor candidate $\hat{a}_i$ can be a quantized set of parameters. The probability generator and processor 211 can thus generate â or define a set of Q reverberation time candidates, for example in the range of $RT_i$=0.1, ..., 5 seconds and determine the decay factor set as $$\hat{a}_i = \exp\left(-1 / \frac{RT_i}{6.91 fs}\right)$$

where i=0, ..., Q-1 and $f_s$ is the sampling frequency. The reverberation time candidates can be generated by any suitable candidate means. For example in some embodiments these candidate values are predefined or/and can be adaptively generated dependent on previously determined reverberation time estimates. The decay factors can in some embodiments by any suitable means, for example any means for implementing the above equation. The maximum likelihood estimate algorithm thus is performed over N frame or "sample" periods.

Thus the probability generator and processor 211 can in some embodiments comprise any suitable expectation means for generating or determining an expectation value dependent on each of the candidate reverberation time values and the encoded audio signal. For example the probability generator and processor can in some embodiments comprise any suitable likelihood means for determining the likelihood the decay factor fits the first part encoded audio encoded audio signal values. For example the probability generator and processor 211 having defined a set of candidate reverberation time values $\hat{a}_i$ inserts these values together with the fixed gain values g or $g_{cb}$ into the following equation $$L(g; a_i) = -\frac{N(N-1)}{2}\ln(a_i) - \frac{N}{2}\ln\left(\frac{2\pi}{N}\sum_{n=0}^{N-1} a_i^{-2n} g^2(n)\right) - \frac{N}{2}$$

to provide a series of candidate likelihood values $L(\hat{a}_i)$.

The operation of generating probabilities for the fixed codebook frame values is shown in FIG. 4 by step 317.

In some embodiments the probability generator outputs these values to the probability selector 213. However in some other embodiments the probability generator and processor 211 furthermore refines the maximum likelihood estimates by performing a normalisation of the histogram of the selected parameters by determining the number of times each quantized reverberation time candidate has been selected.

For example in some embodiments the probability generator and processor 211 selects the reverberation time estimate corresponding to the first value in the probability density function and normalises the remaining probabilities based on this probability. In some further embodiments as the minimum estimated reverberation time (which would typically be the first value) can provide an underestimation, the probability generator and processor 211 selects the estimate for normalisation by selecting the normalising value of a as $$a = \arg\left\{P(x) = \alpha : P(x) = \sum_{i=0}^{x} p(\hat{a}_i)\right\}$$

where $p(a_i)=c_i/\Sigma_{n=0}^{Q-1} c_n$ and $c_i$ (i=0, ..., Q-1) is the number of incidents the quantized reverberation estimate $\hat{a}_i$ is selected within the given analysis window. As $$\sum_{i=0}^{Q-1} p(\hat{a}_i) = 1$$

the threshold α corresponds to a percentage value. A suitable value for the threshold is for example set to 5% to 10%.

The normalization of the probabilities is shown in FIG. 4 by step 319.

In some embodiments the reverberation time estimator further comprises a probability selector 213. The probability selector 213 is passed the normalised probabilities and selects the quantized decay factor $\hat{a}_i$ with the highest probability L. The selected highest probability quantized decay factor $\hat{a}_i$ can then be passed from the probability selector to the reverberation time determinator 215.

The selection of the highest probability quantized decay factor is shown in FIG. 4 by step 321.

The reverberation time estimator 101 further comprises in some embodiments the reverberation time determiner/processor 215. The reverberation time determiner/processor 215 receives the estimate of the decay time $\hat{a}_i$ and from this value determines the value of the reverberation time $RT_i$ using the log of the decay time as shown by solving the equation $$\hat{a}_i = \exp\left(-1 / \frac{RT_i}{6.91 fs}\right).$$

In some embodiments the reverberation time determiner 215 is a look-up table which has stored the original selected RT values and the associated a values and from the highest probability a value selects the RT value which generates the â value.

The advantages thus of determining the reverberation time estimate using the coded domain reverberation time estimation process described above are that a bit stream of a typical speech codec decoded to generate a frame (or sub-frame in the case of AMR-WB of typically 5 milliseconds) has a typical sampling rate of either 8000 or 16000 Hz however using the coded domain there would be typically be a parameter sampling rate of 200 Hz. The lower sampling rate would further be advantageous to reduce the estimation window length samples. A 16 kHz sampled signal to be analysed over 60 milliseconds would require 960 samples whereas a coded parameter version requires 12 sub-frame samples. Furthermore there is no need to reconstruct the samples and therefore waste processing on regenerating audio signals when or where synthesis is not required.

With respect to FIGS. 5 and 6, further embodiments of the application are shown. The structural description of the reverberation time estimator 101 as shown in FIG. 3 differs from the reverberation time estimator 131 shown in FIG. 5 in that the reverberation time estimator shown in FIG. 5 further comprises a window processor 401. FIG. 6 describes the operation of the window processor 401 in further detail.

The window processor 401 is configured to receive the fixed gain values from the current frame and the previous frame values and determine a window length N.

The window processor 401 on receiving the next frame fixed codebook gain value can determine a nominal window length. For example in some embodiments the nominal window length is equal to 12 sub-frames and as such a value of N=12 can be set by the window processor 401.

The operation of determining a nominal window length is shown in FIG. 6 by step 501.

The window processor 401 is furthermore configured to examine the previous parameter values to determine whether or not there has been a monotonic progression, in other words whether the signal has decayed for more than just a short window of values. The window processor 401 can determine whether or not there has been a decay progression or substantially monotonically decaying function by combining fixed codebook gain values over various window lengths. These fixed codebook gain values may be combined in any suitable manner to form window parameters values to be tested. For example an average or mean of the fixed codebook gain for nominal window lengths can be determined.

Furthermore the window processor 401 in some embodiments is configured to determine similar parameters for the fixed codebook gain value for the window length of frames preceding the current nominal window length number of frames.

For example where the current frame being analysed has a reference value of 0 and all preceding frame values are referenced as −k for the $k^{th}$ preceding frame, the window processor 401 can determine the mean of the fixed codebook gain for the current window frame values −(N−1) to 0 and the previous window from −(2N−1) to −(N). The window processor 401 can then compare the previous window parameter against the current window parameter where the previous N frames fixed codebook gain value is less than the fixed codebook gain average value for the frames prior to that a further iteration can be carried out.

The operation of testing the window parameters (the average fixed codebook gain values) are different is shown in FIG. 6 by step 503.

Where the window processor 401 determines that the previous window parameters (average fixed codebook gain) is higher than the window parameter (average fixed codebook gain value) the analysis window N value is set to the nominal window length.

The operation of setting the analysis window length to N where the window parameter for the current N frames is greater than the previous N frames is shown in FIG. 6 by step 504.

The window processor 401 in some embodiments then checks a wider window to determine if it also shows decay characteristics. The window processor 401 thus in some embodiments compares the window parameter for the current 2N frames against the previous 2N frames. In other words the average fixed codebook gain value for the frames from −(2N−1) to 0 are compared against the average value of the fixed codebook gain for −(4N−1) to −2N.

The operation of comparing window parameters for a window of 2N frame length is shown in FIG. 6 by step 505.

If the window processor 401 determines that the current 2N window parameter is greater than the previous 2N window parameter then the analysis window is set to 2N. In other words the average value over the current 2N frames is greater than the previous 2N frames and there is no clear decay over the 4N frames.

The operation of setting the analysis window at 2N frames is shown in FIG. 6 by step 506.

The window processor 401 in some embodiments when it detects that the current 2N frame window parameter (average fixed codebook gain value) is less than the previous 2N frame window parameter (average fixed codebook gain value) and therefore there is an indication of decay over 4N frames can carry out a further iteration whereby the window parameter for the current 4N frames is compared against the window parameter for the previous 4N frames. In other words the average fixed codebook gain value for the frames −(4N−1) to 0 are compared against the average fixed codebook gain for the period −(8N−1) to −(4N). The operation of comparing window parameters for a window of 4N frame lengths is shown in FIG. 6 by step 507.

Where the window parameter (average fixed codebook gain) for the current 4N frames is greater than the previous 4N frames then the window processor 401 can set the analysis window to 4N frames in length.

The operation of setting the analysis window to 4N is shown in FIG. 6 by step 508.

Where the window parameter (average fixed codebook gain) for the previous 4N frames is less than the previous 4N frames then the window processor 401 can set the analysis window to 8N frames in length.

The operation of setting the analysis window to 8N frames in length is shown in FIG. 6 by step 509.

The window processor 401 outputs to the buffer 203 the analysis window length value which enables the buffer to pass the number of fixed and variable codebook gain values to be analysed according to the operations discussed previously.

The adaptive window length L example shown above could be represented by the follow pseudo-code:

```
If (g_cb(a)^T g_cb(a)≤g_cb(b)^T g_cb(b)) {
    If (g_cb(c)^T g_cb(c)≤(g_cb(a)^T g_cb(a)+g_cb(b)^T g_cb(b))) {
        If (g_cb(d)^T g_cb(d)≤(g_cb(a)^T g_cb(a)+g_cb(b)^T g_cb(b)+g_cb(c)^T g_cb(c))) {
            L = 8N
        }
        Else {
            L = 4N
        }
    }
    Else {
        L = 2N
    }
    L = N
}
``` where
(a) = {−N + 1, . . . , 0},
(b) = {−2N + 1, . . . , −N}
(c) = {−4N + 1, . . . , −2N},
(d) = {−8N + 1, . . . , −4N}

As such the maximum window length can be achieved when the average signal energy is monotonically decreasing as shown in the figure below:

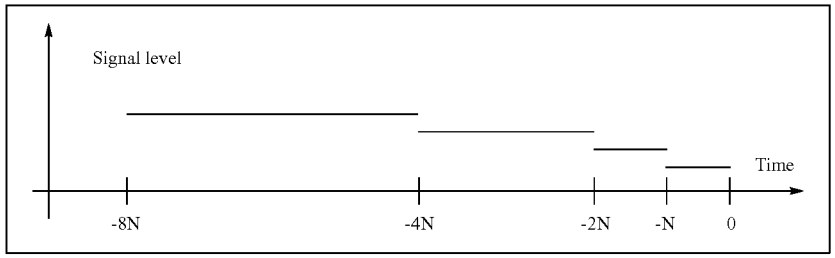

Furthermore in some embodiments as the adaptive window affects the long-term prediction gain then the adaptive gain correlator 205 and average adaptive gain correlator 207 may be configured such that the thresholds used to discard the frame codebook value or the estimated completely can be changed such that the long term prediction gain threshold (the adaptive gain value) is as follows.

| Analysis window length [N, . . . , 8N] | LTP gain threshold [0.0-1.3] |
|---|---|
| N | <0.3 |
| 2N | <0.4 |
| 4N | <0.6 |
| 8N | <1.0 |

Also in some further embodiments the LTP gain threshold (the adaptive gain value threshold) can be set for an average value during the analysis window time span in which case slightly higher values for each threshold are used. Furthermore in some embodiments in addition to an average gain threshold a maximum long term prediction (LTP) gain threshold could be set. In other words the LTP gain is not allowed to exceed a certain value otherwise the reverberation time estimate is discarded. Although the above example showed a doubling of the window length on each determination it would be understood that any adjustable window length system could be employed.

LTP delay, in other words the pitch lag parameter, can in some embodiments be used to determine the coherence of the decaying detail. When the signal is strongly reverberant and thus has lots of scattered sounds coming from different direction, it would be expected that the pitch lag estimation of the speech/audio encoder will result in highly fluctuating results. That is the pitch lag parameter contour should look fairly random. In some embodiments therefore the pitch lag parameter can be used to determine whether a frame is suitable for estimation or use in estimation.

Therefore in some embodiments the apparatus could be considered to comprise event determiner means for determining a decaying encoded audio signal event; and event selector means for selecting the first part of an encoded audio signal, the fixed codebook values associated with the frames of the decaying encoded audio event.

With respect to FIGS. 7 and 8, some further embodiments of the application are described. Specifically with regards to FIG. 7 a time reverberation estimator 151 is shown which differs from the time reverberation estimator 101 shown in FIG. 3 in that the time reverberation estimator 151 further comprises a voice/discontinuity indicator decoder 601 and a voice/discontinuity detector 603. In these embodiments it can be considered that the time reverberation estimator 151 comprises an encoded signal selector means configured to select the first part of the encoded signal, such as the fixed codebook values, dependent on an activity indicator, such as the voice indicator and/or discontinuity indicator associated with the first part of the encoded signal.

The reverberation time estimation value is valid only when there is an active signal. Estimating the reverberation time using a signal from background noise or silence would therefore not produce reliable results and estimation results should be discarded when the signal activity level is low. To assist in detecting these low activity situations the received bit stream may comprise voice activity detection or discontinuity transmission indicators. The voice/discontinuity decoder 601 is in some embodiments configured to receive the bit stream from the apparatus 10 and decode the bit stream to separate the voice and/or discontinuity information.

The extraction of the voice activity indicator (VAD) and the discontinuity indicator (DTX) is shown in FIG. 8 by step 701.

The voice/discontinuity detector 603 receives the information received and decoded from the voice/discontinuity decoder 601. The voice/discontinuity detector 603 is configured to receive these indicators and control the probability generator and processor 211 such that a reverberation time estimation is not generated when the bit stream is not active. Thus for example if the voice activity indicator is not active in some embodiments the voice/discontinuity detector 603 is configured to switch off the estimation process carried out by the probability generator and processor 211. In some other embodiments the voice/discontinuity detector 603 is further configured to control the probability generator and processor to discard the reverberation estimation of the current frame. Furthermore in some other embodiments the voice/discontinuity detector 603 is further configured to control the probability generator and processor 211 to copy a previous estimate as the current estimate for this frame, in other words replace an estimate with a low confidence level with a previous estimate with a higher confidence level.

Similarly the voice/discontinuity detector 603 when detecting a discontinuity indicator value as being active, in other words that there is no signal being received above a certain signal activity level then the voice/discontinuity detector may control the probability generator and processor 211 in a similar manner to that described above.

The operation of determining whether or not the VAD/DTX indicator is active is shown in step 703 of FIG. 8.

Furthermore the operation of controlling the estimation such that either the estimation is switched off, or discarded or the previous estimator copied as the current estimate is shown in FIG. 8 by the step 707.

Where the voice/discontinuity detector 603 determines that there is either a voice activity or a lack of a discontinuity indicator then the voice/discontinuity detector 603 is configured to control the probability generator and processor 211 in order to carry out the generation of the probabilities as described previously.

In such embodiments a saving of processing is possible where the confidence level of the estimate generated would be low.

Thus user equipment may comprise a reverberation time estimator such as those described in embodiments of the invention above.

It shall be appreciated that the term user equipment is intended to cover any suitable type of wireless user equipment, such as mobile telephones, portable data processing devices or portable web browsers.

Furthermore elements of a public land mobile network (PLMN) may also comprise audio codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The design of embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be designed by various components such as integrated circuit modules.

As used in this application, the term 'circuitry' refers to all of the following:

(a) hardware-only circuit implementations (such as implementations in only analog and/or digital circuitry) and (b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method comprising:
extracting and de-quantizing, from a bitstream, an excitation gain of an encoded audio signal representing an audio signal; and
determining a reverberation time estimate for the audio signal from the excitation gain of the received encoded audio signal representing the audio signal.

2. The method as claimed in claim 1, wherein determining a reverberation time estimate from an encoded audio signal further comprises:

determining at least two candidate reverberation time values;

determining an expectation value dependent on each of the candidate reverberation time values and the encoded audio signal; and selecting the candidate reverberation time value with the greatest expectation value as the reverberation time estimate.

3. The method as claimed in claim 2, wherein determining the expectation value comprises:

determining a decay factor from the candidate reverberation time value; and determining a likelihood the decay factor fits the excitation gain encoded audio signal.

4. The method as claimed in claim 1 further comprising:

selecting the excitation gain of the encoded audio signal dependent on an activity indicator associated with the excitation gain of the encoded audio signal.

5. The method as claimed in claim 1, wherein the encoded signal further comprises a long term prediction gain, each excitation gain having an associated long term prediction gain and the method further comprising at least one of:

selecting the excitation gain of the encoded audio signal dependent on the associated long term prediction gain having a value less than a first predetermined threshold value; and selecting the excitation gain of the encoded audio signal dependent on the associated long term prediction gain having an average value less than a further predetermined threshold value.

6. The method as claimed in claim 1, further comprising:

determining a decaying encoded audio signal event; and selecting the first part of an encoded audio signal for the decaying encoded audio event.

7. The method as claimed in claim 1, further comprising generating the encoded audio signal from the audio signal.

8. The method as claimed in claim 1, further comprising receiving the encoded audio signal from an apparatus.

9. An apparatus comprising at least one processor and at least one memory including computer program code the at least one memory and the computer program code configured to, with the at least one processor, cause the apparatus at least to:

extract and de-quantize, from a bitstream, an excitation gain of an encoded audio signal representing an audio signal; and determining a reverberation time estimate for the audio signal from the excitation gain a first part of the received encoded audio signal representing the audio signal.

10. The apparatus as claimed in claim 9, wherein the at least one memory and the computer program code configured to determine a reverberation time estimate from an encoded audio signal is further configured to cause the apparatus to:

determine at least two candidate reverberation time values;

determine an expectation value dependent on each of the candidate reverberation time values and the encoded audio signal; and select the candidate reverberation time value with the greatest expectation value as the reverberation time estimate.

11. The apparatus as claimed in claim 10, wherein the at least one memory and the computer program code configured to determine the expectation value cause the apparatus to:

determine a decay factor from the candidate reverberation time value; and determine a likelihood the decay factor fits the excitation gain encoded audio signal.

12. The apparatus as claimed in claim 9, wherein the at least one memory and the computer program code further cause the apparatus at least to:

select the excitation gain of the encoded audio signal dependent on an activity indicator associated with the excitation gain of the encoded audio signal.

13. The apparatus as claimed in claim 9, wherein the encoded signal further comprises a long term predication gain, each excitation gain having an associated long term predication gain and further cause the apparatus to:

select the excitation gain of the encoded audio signal dependent on the associated long term predication gain having a value less than a first predetermined threshold value; and select the excitation gain of the encoded audio signal dependent on the associated long term predication gain having an average value less than a further predetermined threshold value.

14. The apparatus as claimed in claim 9, wherein the at least one memory and the computer program code further cause the apparatus at least to:

determine a decaying encoded audio signal event; and select the first part of an encoded audio signal for the decaying encoded audio event.

15. The apparatus as claimed in claim 9, wherein the at least one memory and the computer program code further cause the apparatus at least to generate the encoded audio signal from the audio signal.

16. The apparatus as claimed in claim 9, wherein the at least one memory and the computer program code further cause the apparatus at least to receive the encoded audio signal from an apparatus.

17. A computer program product, embodied in a non-transitory computer-readable medium, comprising computer code configured to extract and de-quantize, from a bitstream, an excitation gain of an encoded audio signal representing an audio signal; and determine a reverberation time estimate for the audio signal from the excitation gain of the received encoded audio signal representing the audio signal.

18. The computer program product as claimed in claim 17, wherein the computer code configured to determine a reverberation time estimate from an encoded audio signal is further configured to:

determine at least two candidate reverberation time values;

determine an expectation value dependent on each of the candidate reverberation time values and the encoded audio signal; and select the candidate reverberation time value with the greatest expectation value as the reverberation time estimate.

19. The computer program product as claimed in claim 18, wherein the computer program code configured to determine the expectation value is further configures to:

determine a decay factor from the candidate reverberation time value; and determine a likelihood the decay factor fits the excitation gain encoded audio signal.

20. The computer program product as claimed in claim 17, the computer program code is further configured to:

select the excitation gain of the encoded audio signal dependent on an activity indicator associated with the excitation gain of the encoded audio signal.

21. The computer program product as claimed in claim 17, wherein the encoded signal further comprises a second part, each excitation gain having an associated second part and further configured to:

select the excitation gain of the encoded signal dependent on the associated long term prediction gain having a value less than a first predetermined threshold value; and select the excitation gain of the encoded signal dependent on the associated long term prediction gain having an average value less than a further predetermined threshold value.

* * * * *

UNITED STATES PATENT AND TRADEMARK OFFICE
CERTIFICATE OF CORRECTION

PATENT NO.        : 9,467,790 B2
APPLICATION NO.   : 13/810877
DATED             : October 11, 2016
INVENTOR(S)       : Ojala It is certified that error appears in the above-identified patent and that said Letters Patent is hereby corrected as shown below:

In the Claims

Column 25,
Line 48, "excitation gain a first part of the" should read --excitation gain of the--.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*